United States Patent [19]

McGehee

[11] Patent Number: 4,468,992
[45] Date of Patent: Sep. 4, 1984

[54] AUTOMATIC SAWING SYSTEM

[76] Inventor: Ronald W. McGehee, 9049 East Rd., Redwood Valley, Calif. 95470

[21] Appl. No.: 449,340

[22] Filed: Dec. 13, 1982

[51] Int. Cl.³ .......................... B27B 1/00; B27B 5/04
[52] U.S. Cl. ........................................ 83/56; 83/71; 83/364; 83/367; 83/368; 144/378
[58] Field of Search ..................... 83/56, 71, 364, 367, 83/368, 487, 488, 508.3; 144/378; 250/561

[56] References Cited

U.S. PATENT DOCUMENTS

| | | |
|---|---|---|
| 3,890,509 | 6/1975 | Maxey . |
| 3,963,938 | 6/1976 | Sanglert . |
| 3,970,128 | 7/1976 | Kohlberg . |
| 3,983,403 | 9/1976 | Dahlstrom et al. . |
| 4,086,496 | 4/1978 | Berry . |
| 4,196,648 | 4/1980 | Jones et al. . |
| 4,205,568 | 6/1980 | Foster ............................... 83/367 X |
| 4,231,460 | 11/1980 | Heikinheimo ..................... 83/367 X |
| 4,281,696 | 8/1981 | Howard et al. . |

Primary Examiner—Frank T. Yost
Attorney, Agent, or Firm—Townsend & Townsend

[57] ABSTRACT

An automatically-controlled system for ripcutting a cant into a plurality of boards includes the conveyor for advancing the cant transversely along a substantially straight path. Optical scanning stations along the path determine the shape of the usable board area which is fed to a control system. The control system, in turn, directs a mechanism which orients the cant on a sawing table. The cant is held in a fixed position on this table while a plurality of overhead saws make a series of parallel cuts on the board. The wane edges fall away and the resulting cut boards are transferred to an outfeed conveyor.

15 Claims, 15 Drawing Figures

AUTOMATIC SAWING SYSTEM

BACKGROUND OF THE INVENTION

1. Field of the Invention

The present invention relates generally to sawmill equipment, and more particularly to an apparatus and method for ripsawing a cant to remove the wane edges therefrom and expose an optimum usable board area.

2. Description of the Prior Art

In sawmill operations, an incoming log is typically cut along a number of parallel, axial planes to yield a number of irregularly shaped planks referred to as "cants." The length of the cant is determined by the length of the log from which it was cut and is the same for all cants cut from the same log. The width of each cant, however, will vary depending on the particular section of the log which was cut. Cants which were derived from the central core of the log will be much wider than those derived from the edges of the log. Moreover, the cants will generally taper in one direction corresponding to the lessening diameter of the tree toward its top.

A cant will generally have two parallel, cut faces resulting from the initial ripsawing of the log, as well as a pair of irregular edges corresponding to the outer perimeter of the log. These rounded or beveled edges are referred to as "wane" edges and must be removed before finish cutting the cant into boards.

An important concern in operating a sawmill is optimizing the recovery of boards from a given log. Normally this will mean maximizing the total board feet of lumber derived from each log, although it may mean recovering a maximum number of boards of a certain length or having some other characteristic which makes them particularly valuable. Regardless of the particular optimization criteria employed, it is not obvious from examining an unfinished cant how to optimize the cutting of the cant into individual boards. For that reason, it would be desirable to provide a method and apparatus for automatically removing the wane edges from a cant to expose an optimum usable board area. It would be particularly desirable if the machine and method were capable of simultaneously sawing the cant into a plurality of individual boards having optimum dimensions.

U.S. Pat. No. 4,086,496 describes a machine for optimally sawing cants which comprises a first conveyor for transporting the cants transversely beneath an optical scanning system. The cants are fed to a second conveying system which delivers them axially beneath a pair of rotary sawblades. The distance between the sawblades may be adjusted in response to the profile determined by the optical scanning means, and the cant is initially oriented to pass through the sawblades at the optimal orientation. Although generally functional, it is very difficult to maintain the proper orientation of the cant as it is advanced beneath the sawblades. Thus, the cant is able to fall out of alignment and the resulting edges are neither optimum nor straight.

Other devices for optimally trimming the wane edges from cants are disclosed in U.S. Pat. Nos. 3,970,128; 3,963,938; 3,983,403; and 3,890,509. A device for removing a single wane edge from a cant prior to ripcutting is disclosed in U.S. Pat. No. 4,196,648.

SUMMARY OF THE INVENTION

The present invention is directed at a method and system for ripcutting planks or cants simultaneously along parallel lines in such a manner that the maximum value of board area is retained. The system directs the cants along a substantially straight path with several work stations located along the path. The board is first sent through a scanning and alignment station where the board is optically assessed and the orientation of the board relative to the path is adjusted. After such adjustment is made, the board is transferred to a sawing station where the board is held stationary while two or more sawblades cut along optimal cutting lines determined by the scanning station. Conveniently, there will be at least four sawblades to remove the wane edges of the cant and cut the cant into three pieces. Additional sawblades can be added to further divide the cant, if desired. The resulting boards are then transferred away from the sawing system for further processing.

The present invention is an improvement over the prior art, as it allows for accurate alignment and cutting of the cants. As typified by the device of U.S. Pat. No. 4,086,496, automatic sawing systems of the prior art have required that, after initial orientation, the cant be translated axially under one or more stationary saws. While such an approach would seem to allow optimum cutting, in fact it extremely is difficult to maintain the alignment of the cant while it is being advanced beneath the saws. The need to advance the cant inhibits the ability to firmly hold the board in the preselected orientation.

One approach to solve this problem is disclosed in U.S. Pat. No. 4,281,696, where after optical scanning, a first edge of the cant is removed by an overhead saw. Thereafter, the cant is advanced beneath conventional overhead saws with the sawn edge held against a fixed boundary wall. In this way, the alignment of the cant beneath the saws is improved, although after sawing the leading wane edge off, internal stress release can cause the "straight" edge to buckle resulting in misalignment. The device, moreover, requires two separate sawing operations which increase both its capital cost and operating cost.

The present invention overcomes the alignment problem by holding the board stationary beneath movable sawblades. A clamping mechanism is provided which engages the cant firmly along its central axis, holding the cant substantially immovably on a stationary sawing table. Thus, the system of the present invention is able to receive an incoming cant, optically scan the cant, align the cant and optimally saw the cant into a desired number of boards while assuring the proper alignment of the cant at all times. The desired cuts are then performed by two or more overhead saws which travel along a fixed path transverse to the forward path of the apparatus. Such a device, which retains the transverse alignment of the cant from the time of receiving to the time of discharge, is unknown in the prior art.

DESCRIPTION OF THE PREFERRED EMBODIMENT

The automatic sawing system of the present invention includes four major subsystems. First, a conveying subsystem is provided for advancing cants along a substantially straight path in a generally transverse direction relative to their elongate axes. The conveying subsystem includes mechanisms for adjusting the alignment of the cant and for supporting the cant in a fixed orientation beneath overhead saws, as will be discussed in detail hereinafter. The second major subsystem is an optical detector which scans the board as it is advanced and determines the orientation which provides for an optimum cut. The third subsystem is an overhead saw which is capable of cutting along at least two predetermined parallel lines while the cant is held stationary along the path. Finally, a control subsystem, typically a microcomputer or programmable digital controller, is provided to oversee the operation of the mechanical systems and to determine the location of the optimal cutting lines.

Figure 1:
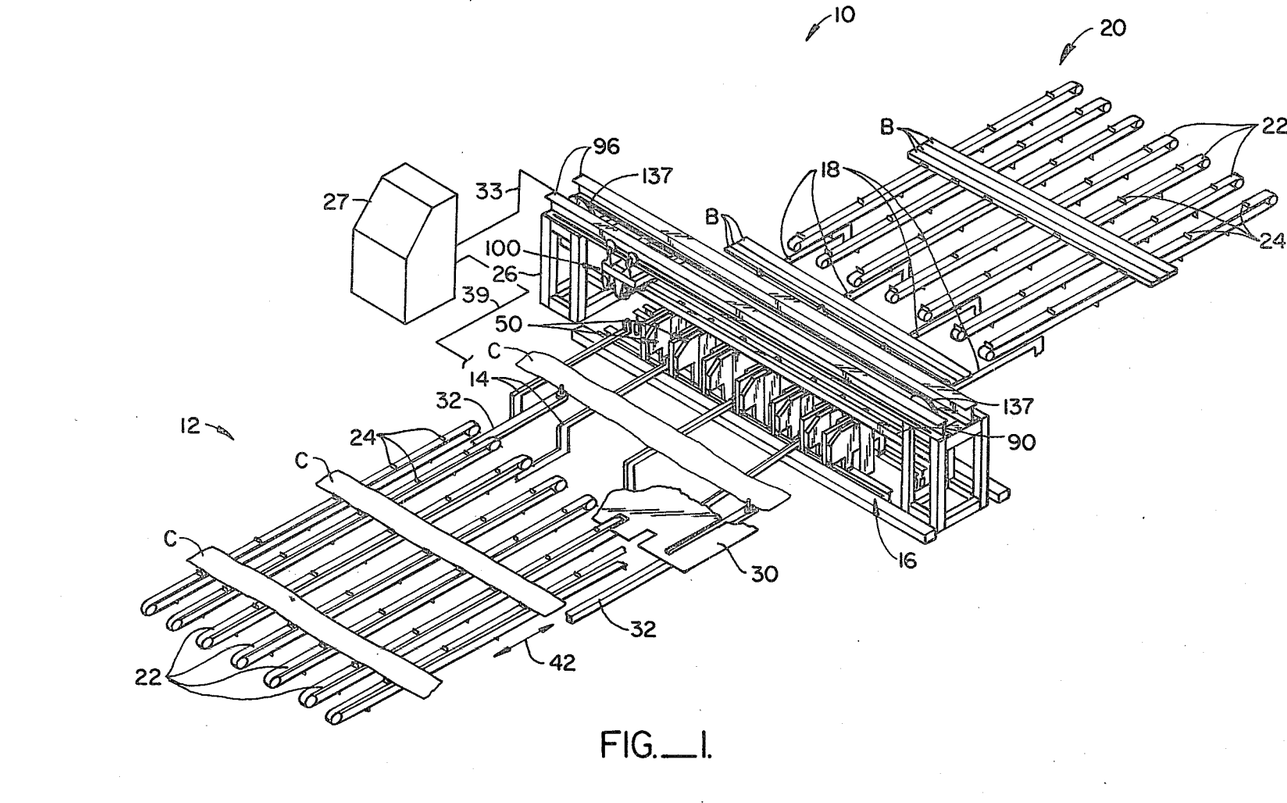
FIG. 1 is an isometric view of the sawing system of the present invention.

Referring to FIG. 1, an overall view of the subsystems of an automatic sawing system 10 constructed according to the principles of the present invention is provided. The conveyor subsystem of the sawing system 10 includes an infeed conveyor 12, a plurality of infeed transfer arms 14, an adjustable-width sawing table 16, outfeed transfer arms 18, and an outfeed conveyor 20. Both the infeed conveyor 12 and outfeed conveyor 20 are conventional chain conveyors comprising a plurality of individual chains 22 which include advancing lugs 24. In each case, the chains 22 are synchronously driven so that the advancing lugs 24 remain transversely aligned and cants C are advanced in a direction substantially normal to their elongate axis. The various components of the conveyor subsystem, as well as the other subsystems, are mounted on a frame 26, a portion of which is shown in FIG. 1. The control subsystem is typically included in a central control apparatus.

Figure 2:
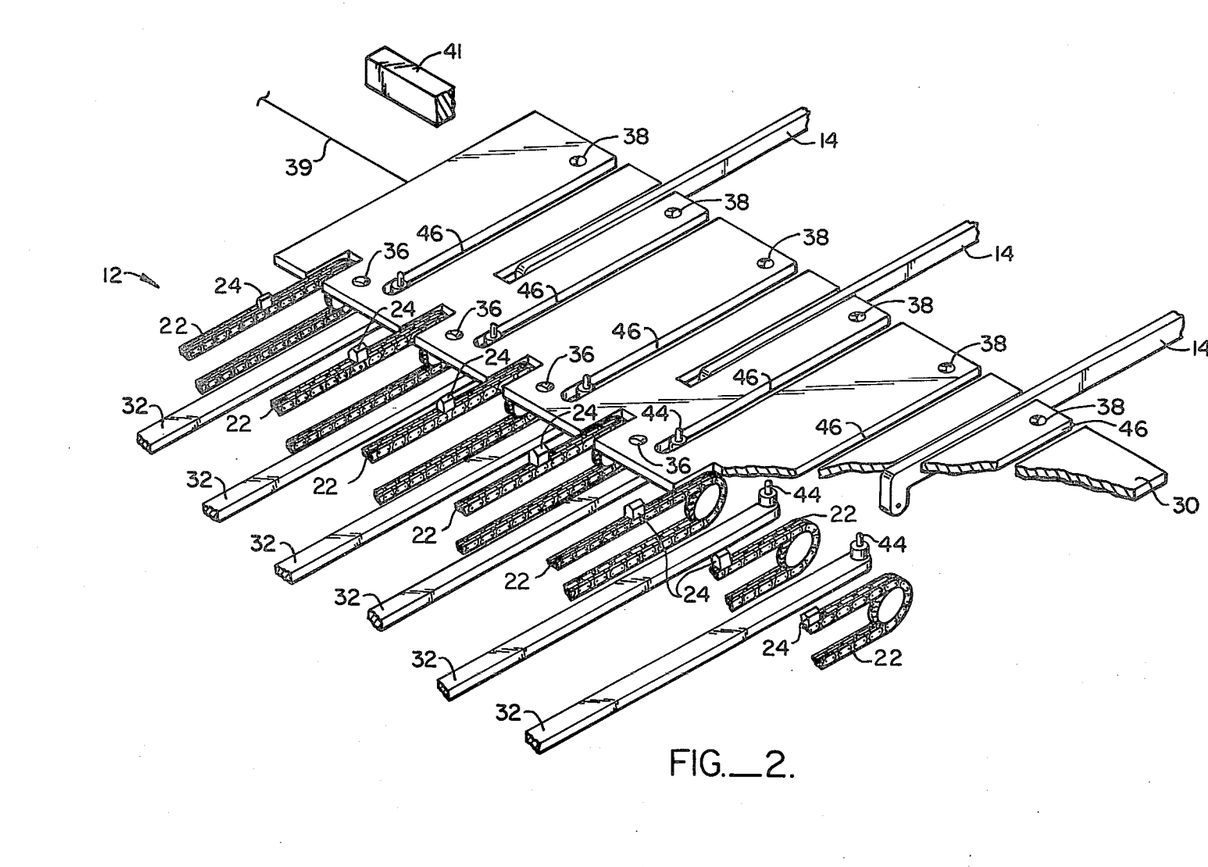
FIG. 2 is a detailed isometric view of the optical scanning table of the present invention.

Referring now to FIGS. 1 and 2, the infeed conveyor 12 terminates at one end of an optical scanning table 30. The infeed arms 14 are disposed at the other end of the optical scanning table 30, and a plurality of advancing rods 32 are provided to transfer the cants C from the table 30 onto the arms 14, as will be described in more detail hereinafter.

The optical scanning system is located at the optical scanning table 30 and comprises a plurality of light sources 36, light detectors 38 and reflectors 40 (FIG. 10) mounted on a reflection bar 41 located above the alignment table for reflecting a beam from source 36 to detector 38. As the cant C is advanced through the optical scanning system, the light beams are interrupted in a pattern corresponding to the shape of the periphery of the cant C, and sufficient information is gathered to allow determination of the optimum orientation of the cant C. This determination is made by the control system, as will be described in detail hereinafter.

The advancing rods 32 each include a mechanism for reciprocating (not shown) the rod back and forth in the direction of arrow 42 (FIG. 1). Additionally, each rod 32 includes a retractable pin 44 at its forward end (to the right in FIG. 2). In its raised position, pin 44 projects upward through a slot 46 in the alignment table 30. When retracted, the pin 44 remains below the surface of table 30. In order to advance a cant C along the table 30, selected ones of the pins 44 are raised and the rods 32 advanced to the right (as viewed in FIGS. 1 and 2). By using two preselected pins 44 and advancing them by incrementally different lengths, the orientation of the cant C can be adjusted as it is advanced over the infeed arms 14 and onto the saw table 16. After sawing the cant C into individual boards B, the outfeed arms 18 lift the boards B from the sawing table 16 and transfer them onto outfeed conveyor 22. Boards B are taken from outfeed conveyor 22 for further processing in a conventional manner.

Figure 3:
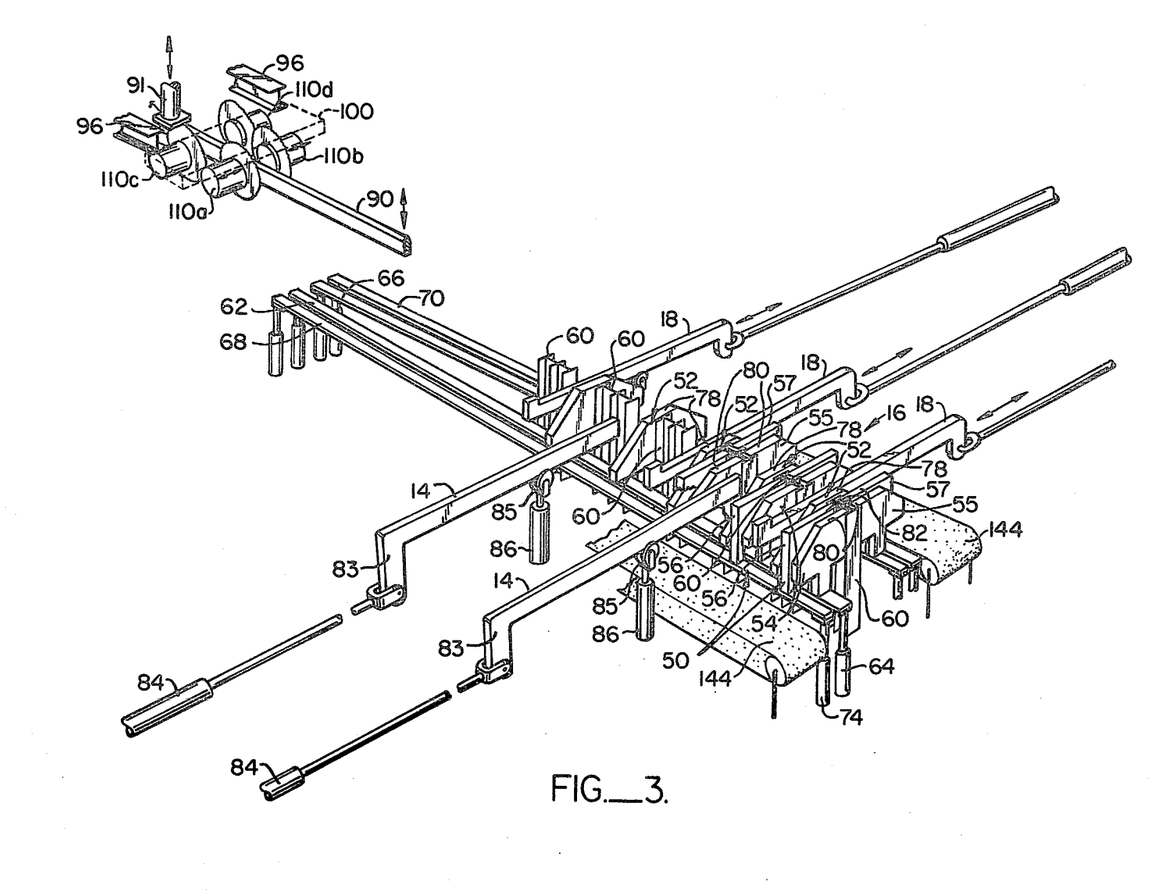
FIG. 3 is a detail view of the saw table, illustrating the relationship of the infeed arms, outfeed arms, overhead saws, and hold-down shoe.
Figures 4, 5:
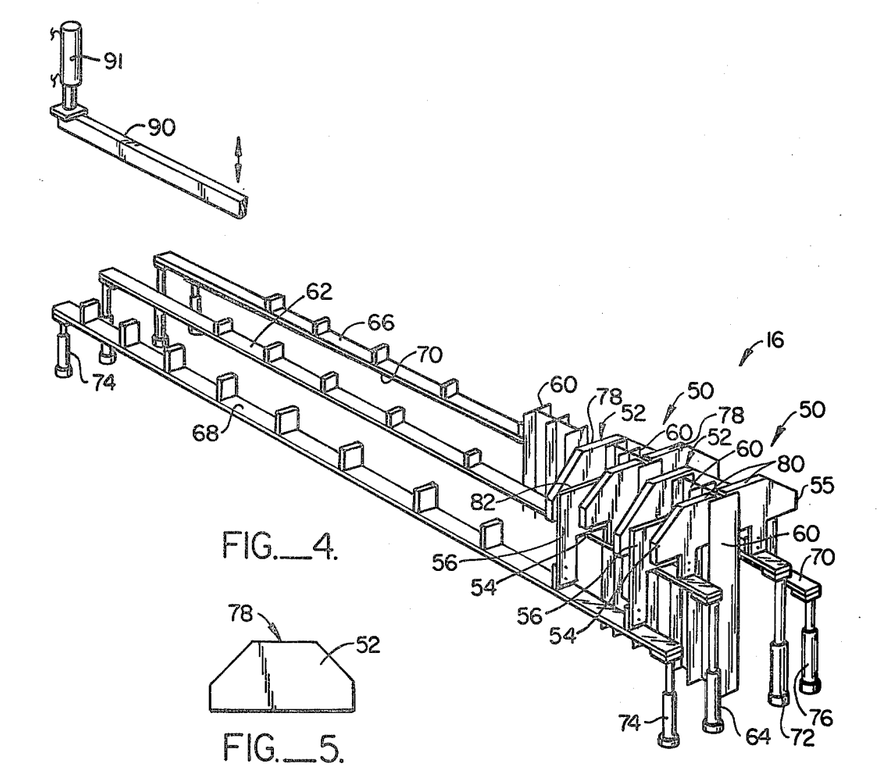
FIG. 4 illustrates the operation of the cant supports of the saw support table.
FIG. 5 is an elevational view of the stationary cant support.

The saw table 16 and infeed transfer arms 14 are illustrated in more detail in FIGS. 3 and 4. The saw table 16 comprises a plurality of cant support assemblies 50 which operate in unison to provide a support surface having a variable width for the cant C. Each cant support assembly 50 comprises a fixed cant support 52 (illustrated in detail in FIG. 5) and four reciprocatable cant supports 54-57. Cant supports 54-55 and cant supports 56-57 are arranged in pairs on opposite sides of a vertical track 60 attached to one surface of the fixed shear 52. Cant supports 54 are mounted on a common support beam 62 (FIG. 4) which in turn is mounted on a plurality of vertical piston and cylinder assemblies 64. Although only two piston and cylinder assemblies 64 are illustrated, additional ones can be added as necessary to support the entire length of beam 62. By reciprocating the piston and cylinder assemblies 64, the shears 54 can be raised and lowered, as desired.

Each of the remaining reciprocatable cant supports 55-57 are mounted on similar support beams 66, 68, and 70, respectively. Each of the support beams 66-70 are mounted on piston and cylinder assemblies 72, 74, and 76, respectively, so that each set of reciprocatable cant supports 54, 55, 56, and 57 may be independently raised and lowered, as desired.

The stationary cant supports 52 define the most narrow support surface 78 for the cants C. As will be described hereinafter, it is necessary that the cants C be supported along their axial central portion so that there is clearance for the sawblades making cuts along the edges thereof. Thus, depending on the width of the particular cant C, a support surface having a different width is required. The most narrow cants are supported solely by the fixed cant supports 52.

For intermediate width cants C, cant supports 54 and 55 are raised. Horizontal surfaces 80 at the top of each cant supports 54 and 55 together define a somewhat wider support surface than the corresponding horizontal surface 78 on fixed cant supports 52. Horizontal support surfaces 82 on the cant supports 56 and 57 extends the full width of the cant support to provide a maximum width support surface. Thus, when supporting the widest cants, it will be necessary to raise at least support cant supports 56 and 57, and usually all cant supports 54-57, as illustrated in FIG. 3.

The infeed transfer arms 14 are L-shaped having short downward extensions 83 at the end remote from the saw table 16. The lower end of the extension 83 is pivotally attached to the rod of a piston and cylinder assembly 84. In this way, the arms 14 can be moved in and out from between adjacent shear assemblies 50, as best observed in FIG. 3. The distal ends of arms 14 are supported on rollers 85 which are in turn supported on piston and cylinder assemblies 86.

When feeding cants C onto the saw table 16, the infeed arms 14 will be extended fully inward (toward the saw table) and raised above the support surface of the table by piston and cylinder assemblies 86. After the cant C is properly positioned by the advance rods 32 over the saw table 16, the arms 14 are lowered and the cant set in place. The cant is then clamped by a hold-down shoe 90, and the arms 14 retracted by cylinders 84. The cant is then ready to be cut by the saw subassembly, as will be described hereinafter.

Figure 6:
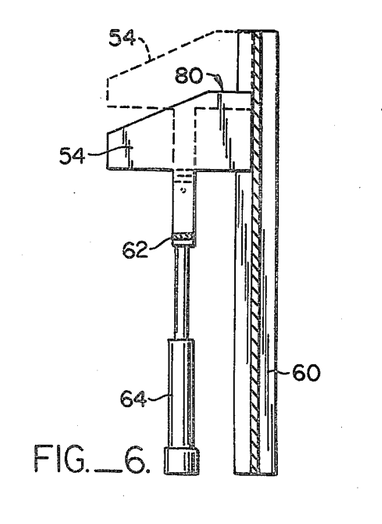
FIG. 6 is a detail view of the first type of reciprocatable cant support.
Figure 7:
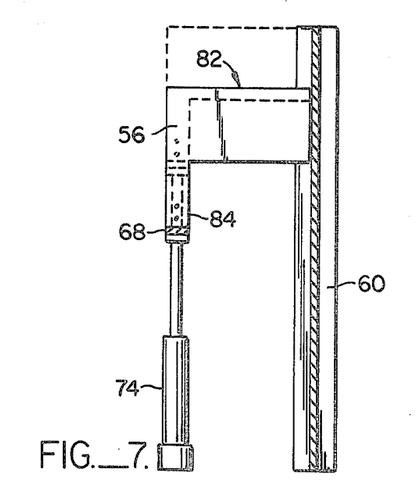
FIG. 7 is a detail view of the second type of reciprocatable cant support.

Referring also now to FIGS. 6 and 7, the operation of saw table 16 will be described in greater detail. Support cant supports 54, mounted on support beam 62, may be fully raised by extension of the piston and cylinder assembly 64. Although only two such piston and cylinder assemblies 64 are illustrated in FIG. 4, additional assemblies 64 may be added as necessary to provide needed structural support. Cant supports 56 are mounted on support beam 68 and hydraulic piston and cylinder assemblies 74.

The hold-down shoe 90 is reciprocatably mounted above the saw table 16 and aligned with the center of the support surface defined thereby. The hold-down shoe 90 is mounted on a plurality of hydraulic piston and cylinder assemblies 91 (only one of which is illustrated) which are mounted on the frame 26 and which allow the shoe to be raised and lowered relative to the support surface in order to clamp the cant C in place while it is being sawed.

Figure 8:
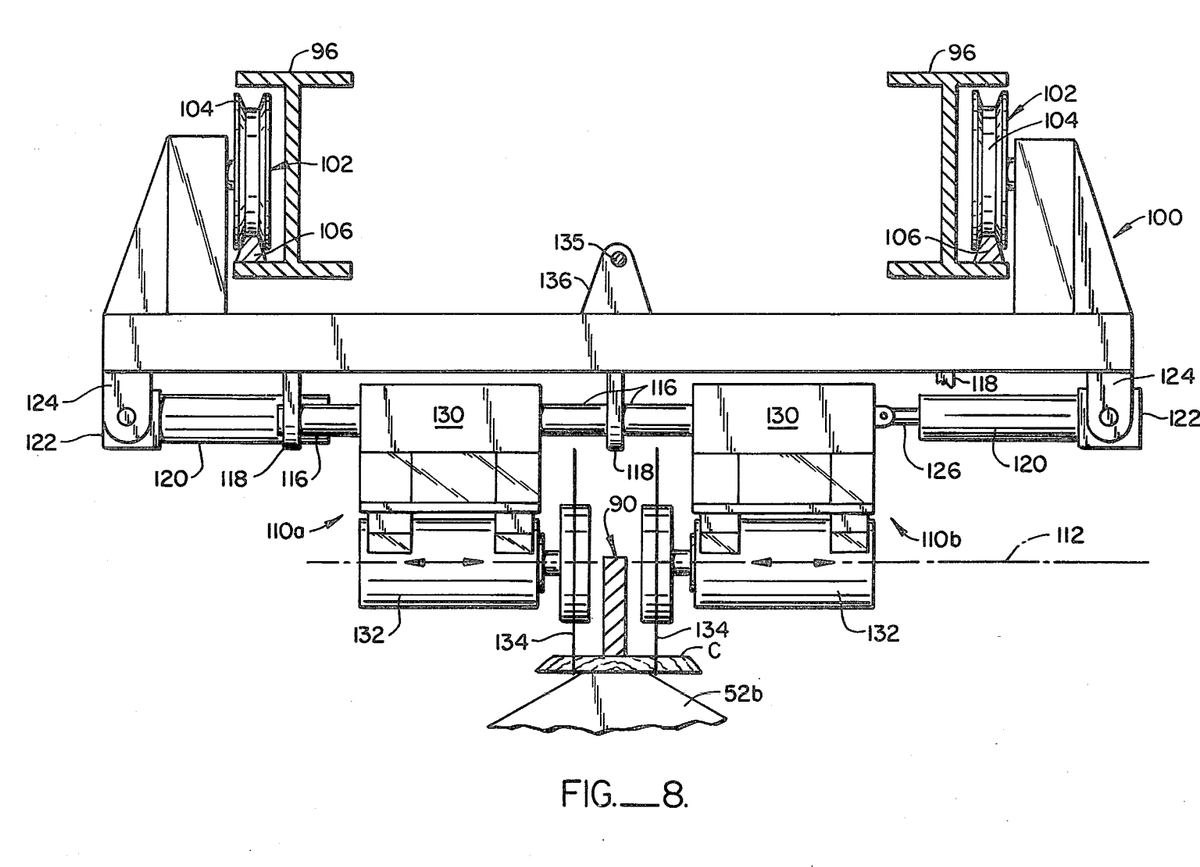
FIG. 8 is a front elevational view of the overhead saw carriage.
Figure 9:
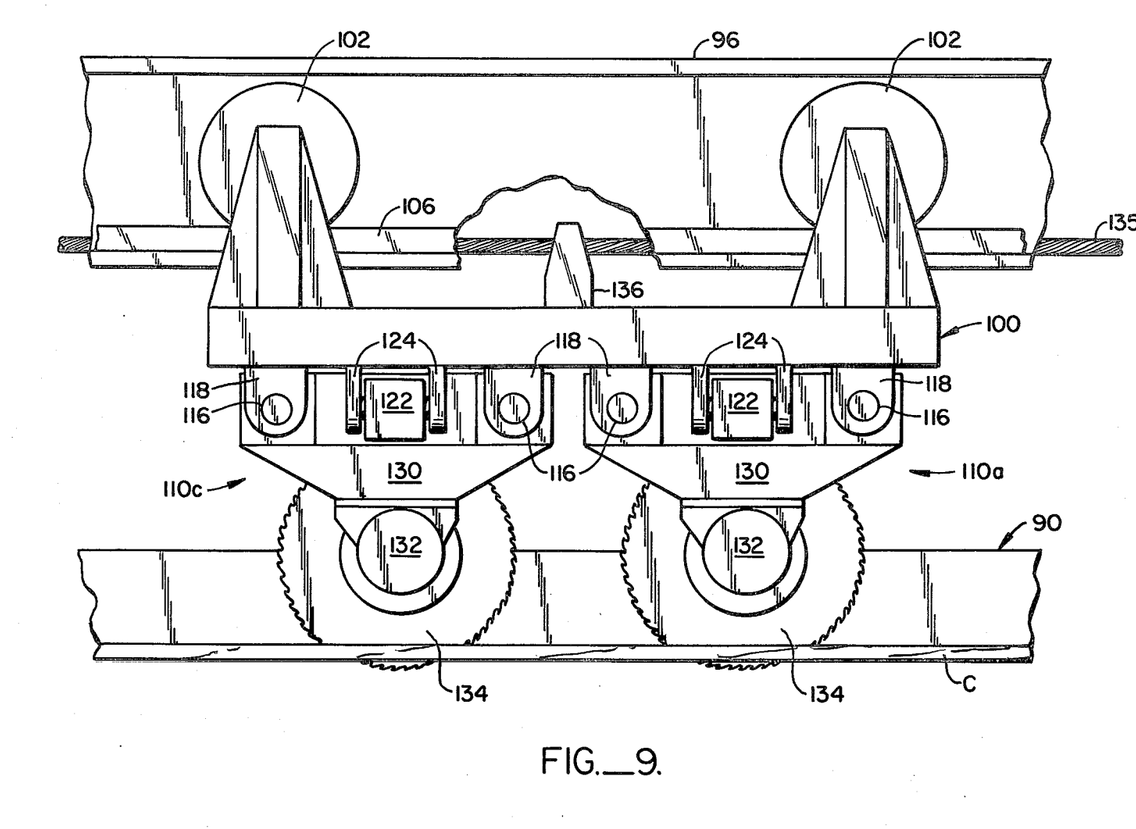
FIG. 9 is a side elevational view of the overhead saw carriage.

Referring now to FIGS. 3, 8 and 9, the overhead saw assembly will be described. A pair of I-beams 96 are mounted on the support frame 26 (FIG. 1). The I-beams 96 are disposed above the saw table 16 and provide a track for the support of a carriage 100. The carriage 100 is mounted on four rollers 102 each of which includes a slotted periphery 104 which runs along a rail 106 on each I-beam 96.

Four circular saw assemblies 110 are mounted on the bottom of the carriage 100, and are able to engage the cant C when it is positioned on the saw table 16. The four saw assemblies 110 are mounted in pairs with the first two assemblies 110a and 110b aligned through the common rotational axis 112 of the saws, and the second two assemblies 110c and 110d also aligned on their respective common axis.

The saw assemblies 110 are each slidably mounted on cylindrical rails 116 which are suspended between support brackets 118. A piston and cylinder assembly 120 is attached at its cylinder end to a mounting block 122 which is supported on the carriage 100 by brackets 124. The piston and cylinder assembly 120 is best observed on the right hand side of FIG. 8, where the cylindrical rails 116 and support bracket 118 have been broken away to expose the connection of the cylinder rod 126 to the circular saw assembly 110b. The assembly 110b can be translated inward and outward by the piston and cylinder assembly 120 to properly position the saw relative to the cant C. All four saw assemblies 110 are similarly mounted so that the translational positions can be independently adjusted by the controller subsystem, as described hereinafter.

Each saw assembly 110 comprises a block 130 which is slidably received on a pair of the cylindrical rails 116. A motor 132, typically an hydraulic motor, is mounted on the bottom of the block 130 and includes a sawblade 134 mounted on the driveshaft thereof.

The carriage 100 is translated across the saw table 16 by cable 135 affixed to the carriage by bracket 136. The cable, in turn, is reeled back and forth by a pair of drive wheels 137 mounted on the frame 26 (FIG. 1). One of the drive wheels 137 is driven by a motor (not shown) which operates under the supervision of the control subsystem. The I-beams 96 extend sufficiently far on either side of the saw table 16 so that the saw blades 134 are clear of the table, and any cants which may be on the table, whenever the carriage 100 is fully translated to either the right or left. Thus, a cant can be placed on the saw table 16 and boards removed from the saw table whenever the carriage is at either end of travel.

Figure 10:
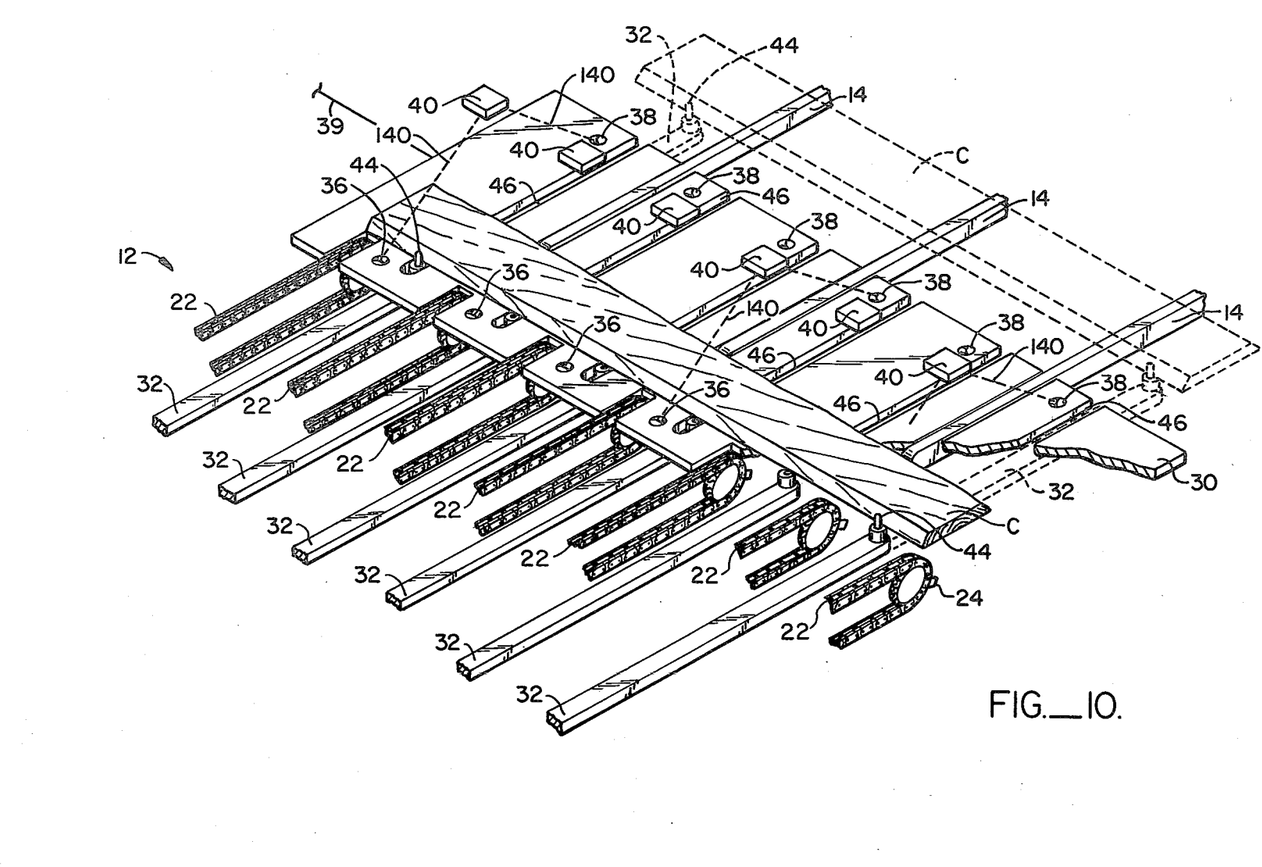
FIG. 10 is a view of the optical scanning table similar to FIG. 2 and illustrating the operation of the optical scanner and the cant alignment device.
Figure 11:
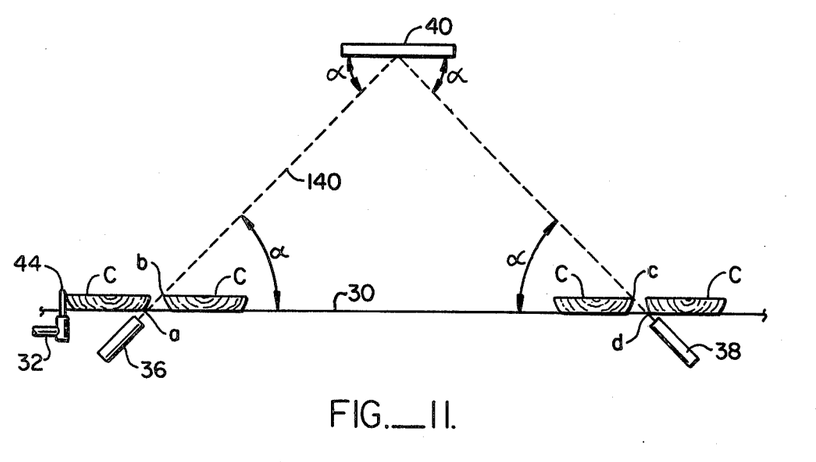
FIG. 11 is a schematic view of the optical scanning system illustrating the scanning of a cant in a first orientation.
Figure 12:
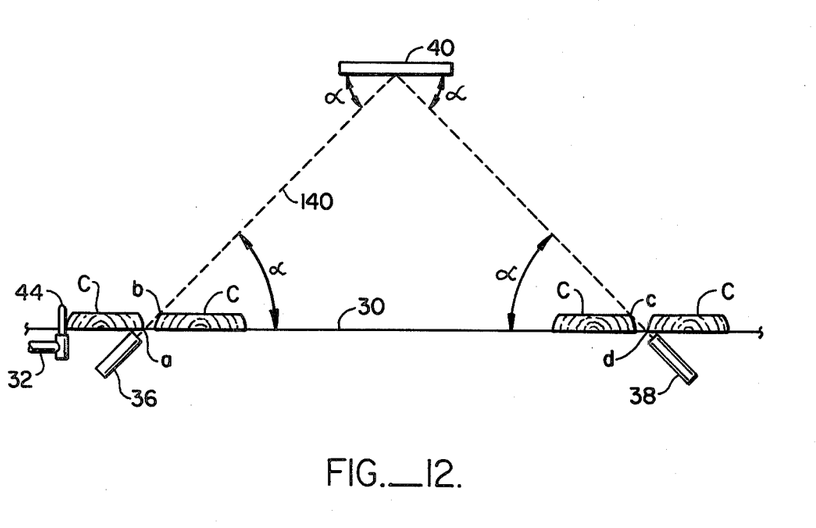
FIG. 12 is a view similar to FIG. 11 illustrating the cant in the inverted orientation.

Referring now to FIGS. 10-12, the operation of the optical scanning system will be described. The optical scanning system was generally described hereinbefore and includes a plurality of light sources 36, light detectors 38 and reflectors 40 which define a triangular light pattern as indicated by broken line 140. Passage of the cant C through either leg of the triangular light pattern interrupts detection of the beam 140 by the detector 38. By knowing the thickness of the board, the speed at which the board is travelling, the value of angle $\alpha$ and the precise duration of each of the two periods during which the beam is interrupted, the distance between the wane points of the cant can be determined.

Referring now in particular to FIG. 11, which illustrates the situation in which the broadface of the cant C is upward, the method of calculation will be described. As the board is advanced across the optical scanning table 30 by a pair of retractable pins 44 (as will be described in greater detail hereinafter), a first wane point of the cant C interrupts the beam 140. This point is illustrated at a. The beam 140 will remain interrupted until the cant C has advanced out of the beam at which time the beam will be restored. The time at which the beam 140 is restored corresponds to the passage of wane point b through the beam path.

The control subsystem, which receives information from the detector 38 through line 39 (FIGS. 1, 2 and 10), can calculate the horizontal distance between points a and b by knowing the thickness of the board and the speed of advance. The thickness of the board can be determined by a wide variety of commercially available systems, such as the Series 1000 Thickness Gauging System available from Trienco, Inc., Montrose, Colo. The Thickness Gauging System is available with a digital output compatible with the control system of the present invention. The speed of advance can be fed to the control system by a position transducer coupled to one of the advance rods 32. Such transducing systems are well-known in the art and need not be described further.

After the cant C passes the upward leg of the beam 140, the beam is restored until wane point c again interrupts the beam at a point proximate the detector 38. The beam 140 remains interrupted until wane point d passes the beam path. The control subsystem is then able to calculate the distance between points c and d in the manner just described. Moreover, since the speed of advance is monitored throughout the entire passage, the control system is able to calculate the distances between points b and c and between points a and d. In this way, the control system can determine the narrowest board face at that location on the board. This information is necessary, of course, since it is the narrowest board face which determines the minimum useable board.

FIG. 12 illustrates the case where the cant C is inverted so that the narrowest board face is facing upward. The control subsystem again determines the width of each face of the cant C by measuring the elapsed time between the passage of the wane points a-d. This time, however, the elapsed time between the passage of points a and d is greater than that for the passage of points b and c, indicating that the a-b face has a greater width.

Figure 13:
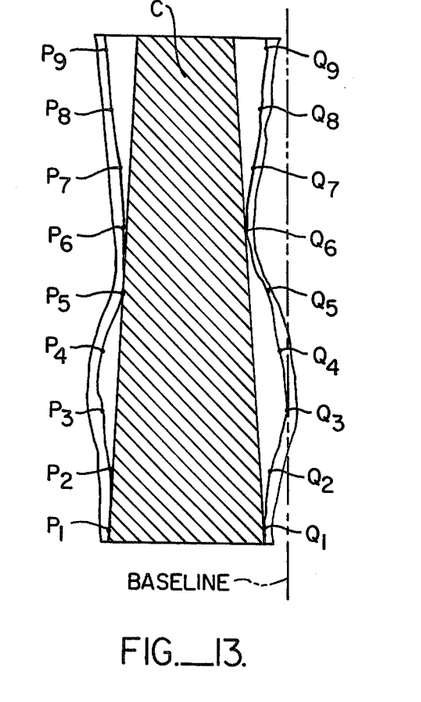
FIG. 13 is a schematic view illustrating the scan points on a typical cant.

The data fed to the control subsystem by the optical scanning system allows the control subsystem to construct a profile of the cant C as illustrated in FIG. 13. For ease of illustration, the cant is shown with its narrow face upward. The locations of a number of wane points, designated as $P_n$ and $Q_n$, are defined in reference to an arbitrary baseline. The baseline is arbitrarily defined as the first wane point on the narrow face of the cant C which passed one of the scanning stations. This is shown as point $Q_3$ on FIG. 13. The remaining points P and Q are then determined relative to the baseline and may be measured in terms of distance or time from the passage of point $Q_3$. The number of points P and Q determined will depend on the number of scanning stations employed, with a greater number of scanning stations allowing a greater resolution of the cant profile.

Figure 14:
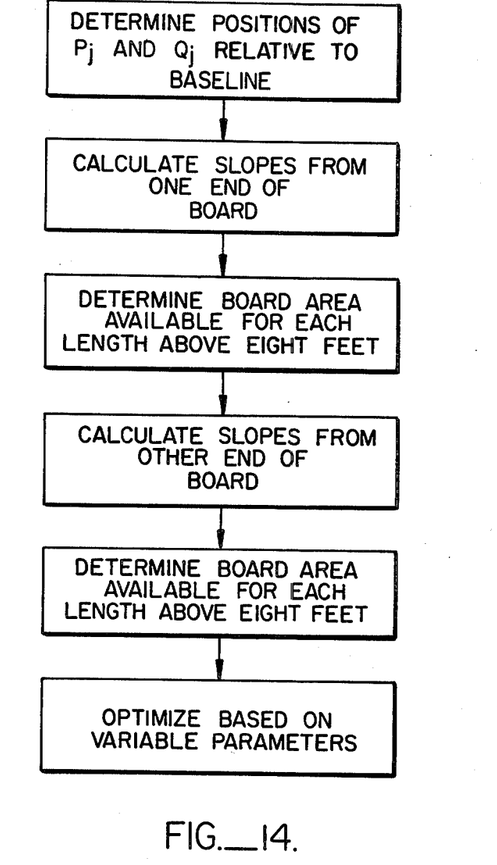
FIG. 14 is a more detailed flow diagram illustrating the method by which the profile of the cant is determined.

After determining the positions of the wane points P and Q, the control system is able to determine the positions for the optimum axial cuts along the cant C. A flow diagram for the determination is shown on FIG. 14. The method used relies on determining the maximum available board area starting from each pair of points P and Q as the base. Starting first at one end of the cant, each pair of points P and Q is examined successively to determine the usable board area which is available if the wane edge were removed along a line defined between those two points. The same calculations are then made from the other end of the board, and the control system is then able to determine which parallel cuts on the cant provide optimum utilization of the cant.

Figure 15:
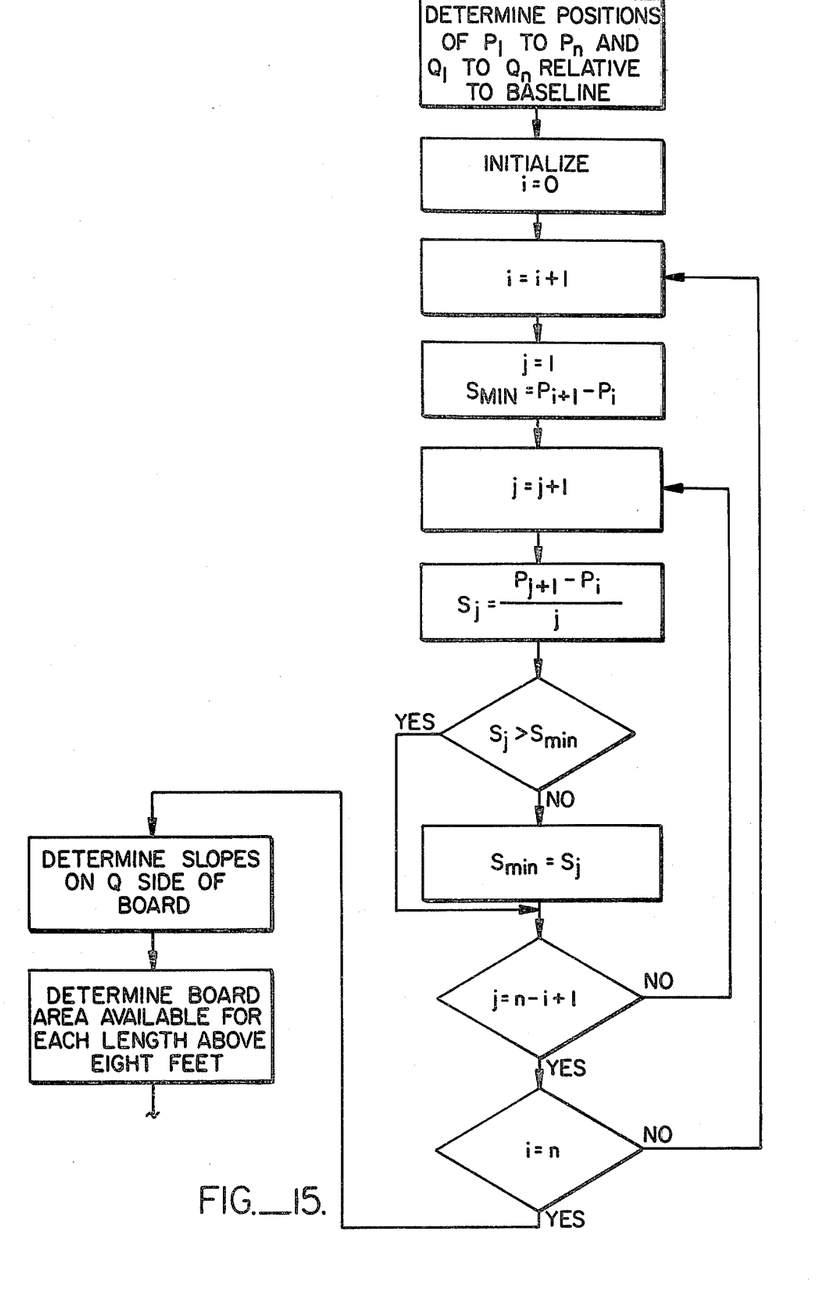
FIG. 15 is an overall flow diagram illustrating the operation of the control system.

The determination of slopes is outlined more clearly in the flow diagram of FIG. 15. Starting with the array of point locations $P_n$, $Q_n$ as determined by the optical scanning system, the control system is able to process the data as follow. Starting, for example, at point ($P_1$), the slope between point $P_1$ and $P_2$ is first determined. Next, the slope between point $P_1$ and $P_3$ is determined and compared to the first slope between $P_1$ and $P_2$. If slope $P_1$-$P_3$ is inclined more toward the center of the board, it is the more limiting slope in that it leads to less useable board area. The control algorithm retains the more limiting slope in memory until all possible slopes have been examined.

After this determination is made for points P, the same determination is made for points Q. The maximum useable board area, starting from the base $P_1$-$Q_1$ can then be determined. This is illustrated as the shaded area on FIG. 13. As can be seen, the boundary lines pass through points $P_1$,$P_5$ and points $Q_1$ and $Q_6$ respectively.

The program then goes through the same interactions starting at points $P_2$ and $Q_2$ as the base. After proceeding from the $P_1$-$Q_1$ end of the board, the program then begins at the $P_n$-$Q_n$ end of the board and looks in the opposite direction.

The notation used in FIG. 15 is as follows. Index i denotes the position of the base points P and Q. That is, the determination of slopes begins at $P_i$-$Q_i$. Index j denotes the point through which the slope is being taken. Parameter n is the total number of scanning stations (and therefore array points) to be examined.

The program as depicted in FIG. 15 uses each pair of base points $P_i$ and $Q_i$ as a starting point for determining slopes. This will usually not be done in practice since base points which are relatively close to the far end of the board would correspond to very short board lengths. In practice, a minimum board length of eight feet is necessary.

The control system of the present invention will typically be a microprocessor based system having software developed specifically for the real time control of the apparatus as described. Such real time control systems are commercially available and need not be described in detail. The control of the mechanical systems will typically be accomplished through digital to analog converters, or through direct digital-controlled servoactuators. Data input to the controller will be achieved using analog-to-digital converters where necessary. Other direct digital outputs, such as a shaft encoder for determining the position of the input feed conveyor, may also be employed. Such control instrumentation, included within central control apparatus 27, is all well within the scope of the art and will not be further described.

Once the useable board areas have been determined, as described hereinbefore, the control system is able to determine the optimum use of the board based on current value of different board sizes. For example, longer boards which utilize less of the total board area may in fact be more valuable than a greater number of shorter boards which utilize a higher percentage of the board area. The value data for lumber can be periodically fed into the control system and used to optimize the desired cut.

Once the desired cut is determined, the control system will calculate the necessary orientation of the board and spacing between the cuts to be made and feed an appropriate control signal through line 33 to the advance rods 32. The orientation is imparted by the advance rods 32. While a plurality of such rods 32 are available, only two of the rods are utilized to advance the board on the optical scanning table 30. Conveniently, the two outermost rods 32 relative to the cant C being processed will be employed. In this way, the orientation of the cant C can be adjusted by the differential advance of the rods 32.

The cant C is deposited on the optical scanning table 30 by the infeed conveyor 12, as illustrated in FIG. 10. Initially, the retractable pins 44 of the advance rods 32 are all retracted so that the board can be deposited beyond the pins 44. Pins 44 on two of the advance rods 32 are then raised so that the pins will engage the board as the corresponding advance rods 32 are moved forward (to the right as shown in FIG. 10). Which pins 44 are raised depends on the length of the board and will be manually fed to the control subsystem by the user, or determined optically and fed directly to the control subsystem.

Initially, the advance arms 32 advance the cant C forward at a uniform rate beneath the optical scanning stations. After the profile data has been obtained and the optimizing calculations made by the control subsystem, the board is oriented by the differential advance of the advance rods 32. The rods 32 push the cant C onto the infeed transfer arms 14, as shown in phantom in FIG. 10. As described hereinbefore, the transfer arms 14 are extended inward and raised above the saw table 16. After the cant C is properly positioned above the saw table, the arms 14 are lowered, lowering the cant onto the table 16. The infeed arms are then retracted, and the cant is in place for sawing.

Prior to making the cuts, the spacing between the sawblades 134 is adjusted as directed by the control system based on the optimum desirable cuts.

The width of the saw table 16 has been adjusted by lowering the appropriate cant supports 54–57 as dictated by the width of the board and the cuts to be made. After the cuts are made, the wane edges fall onto conveyors 144 (FIG. 3) and are removed. The cut boards are then taken to the outfeed conveyor 20 by outfeed transfer arms 18. Operation of the outfeed transfer arms 18 is similar to that of the infeed arm 14. After the cant C has been sawed, the outfeed arms 18 are lowered and brought in between adjacent shear assemblies 50. Once in place beneath the boards B, the outfeed arms are raised and retracted, carrying the boards onto the outfeed conveyor 20.

Although the foregoing invention has been described in some detail by way of illustration and example for purposes of clarity and understanding, it will be obvious that certain changes and modifications may be practiced within the scope of the appended claims.

What is claimed is:

1. An apparatus capable of ripcutting an elongate cant simultaneously along two parallel, spaced-apart lines to remove the wane edges thereof, said apparatus comprising:
    means for conveying the cant in a direction transverse to its elongate axis and along a substantially straight path;
    means located along the path for holding the cant in a fixed position relative to the path;
    first and second circular saws which are reciprocatably mounted above the means for holding, to cut along parallel, spaced-apart cutting lines which are generally transverse to the direction of the path, the distance between the parallel lines being adjustable;
    means located along the path upstream from the saws for determining a particular combination of (a) the orientation of the cant relative to the saws and (b) the distance between the cutting lines of the saws which results in optimization of a desired parameter; and
    means located along the path intermediate to the determining means and the saws for adjusting the orientation of the cant relative to the saws in response to the determining means and for placing the cant on the means for holding.

2. An apparatus as in claim 1, wherein the means for holding comprises:
    a saw table defined by a plurality of vertically reciprocatable cant supports, ones of said cant supports having horizontal surfaces of different widths;
    means for reciprocating said ones of said shears independently to define a support surface for the cant having a preselected width; and
    means for clamping the cant against the saw table.

3. An apparatus as in claim 1, wherein the means for determining comprises:
    optical scanning means for assessing the profile of the cant and generating a signal corresponding to said profile; and
    central control apparatus for evaluating said signal.

4. An apparatus as in claim 3, wherein the means for adjusting the orientation of the cant comprises,
    a pair of advancing rods having means for engaging the can at locations spaced-apart in the transverse direction;
    means for differentially advancing said advancing rods in response to said optical scanning signal.

5. An apparatus for removing the wane edges from a cant with minimum waste, said apparatus comprising:
    means for conveying the cant along a substantially straight path in a direction which is generally transverse to the elongate axis of said cant;
    a plurality of optical scanning stations spaced-apart along a line transverse to the path, each of said stations including:
        (a) means for directing a first light beam in a substantially vertical plane which is aligned with the path, said first beam being inclined at an angle selected so that said beam is interrupted by passage of one corner of the leading wane edge and restored after passage of one corner of the trailing wane edge;
        (b) means for directing a second beam in said vertical plane, said second beam being inclined at an angle selected so that said beam is interrupted by passage of the other corner of the leading wane edge and restored after passage of the other corner of the trailing wane edge; and
        (c) means for observing when said first and second beams are interrupted and for generating an indicative signal;
    a central control apparatus for receiving said indicative signals from each of said stations and determining the optimal cutting pattern for the cant; and
    means for cutting the cant in response to said optimal cutting pattern.

6. An apparatus as in claim 5, wherein the means for directing a second beam comprises a mirror which reflects the first beam generally downward, and wherein the means for observing comprises a single detector which observes whether the beam is complete at the end of the second beam path.

7. An apparatus as in claim 5, wherein the means for cutting comprises:
    means located along the path for holding the cant in a fixed position relative to the path; and
    first and second circular saws, which are reciprocatably mounted above the means for holding, to cut along parallel, spaced-apart cutting lines which are generally transverse to the direction of the path, the distance between the parallel lines being adjustable.

8. \n apparatus for ripsawing a cant simultaneously along at least two parallel, spaced-apart lines, said apparatus comprising:
a central control apparatus;
an optical scanning table;
means for feeding individual cants to the optical scanning table as directed by the central control apparatus;
means for advancing the individual cants along the optical scanning table;
means for optically scanning the individual cants as they are advanced along the optical scanning table and for transmitting a signal representative of the cant profile to the central control apparatus;
a saw table;
means for orienting the individual cants and transferring them to the saw table, after they have been optically scanned, as directed by the central control apparatus in response to the profile signal;
means for clamping the cant to the saw table;
at least two circular saws mounted above the saw table and capable of simultaneously sawing along parallel, spaced-apart lines, the distance between the lines determined by the central control apparatus in response to the profile signal; and
means for removing individual cants from the saw table.

9. An apparatus as in claim 8, wherein the means for feeding individual cants comprises a chain conveyor.

10. An apparatus as in claim 8, wherein the means for advancing and means for orienting and transferring together comprise:
a plurality of infeed transfer arms;
means for positioning the infeed transfer arms so that they span a gap between the optical scanning table and the saw table;
at least two advancing rods having means for engaging the cants on the optical scanning table; and
means for advancing the advancing rods to translate the cant passed the optical scanning means and across the infeed arms to a position above the saw table, said means being capable of differentially advancing the arms in response to the profile signal.

11. An apparatus as in claim 8, wherein the saw table comprises:
a plurality of vertically reciprocatable cant supports, ones of said cant supports having horizontal surfaces of different widths; and
means for reciprocating said ones of said cant supports independently to define a support surface for the cant having a preselected width.

12. A method for ripcutting an elongate cant simultaneously along at least two parallel, spaced-apart lines to remove the wane edges thereof and leave an optimum remaining board area, said method comprising:
advancing the cant transversely along a path;
optically scanning the cant at a first location along the path to determine the profile of both wane edges;
determining the location of parallel lines which will yield the optimum board area free of the wane edges; and
cutting the cant simultaneously along each line while said cant is held firmly in place at a second location along the path.

13. A method as in claim 12, wherein the cant is optically scanned by passing the cant through a plurality of first light beams located in spaced-apart vertical planes and inclined at an angle selected so that the beam is interrupted by passage of one corner of the leading wane edge and restored after passage of one corner of the trailing wane edge, and thereafter passing the cant through a plurality of second light beams located in said vertical planes and inclined at an angle selected so that the second beam is interrupted by passage of the other corner of the leading wane edge and restored after passage of the other corner of the trailing wane edge, whereby the time interval between interruption and restoration of the first light beams and the second light beams is indicative of the cant profile.

14. A method as in claim 12, wherein the location of the parallel lines is determined by iteratively calculating the different rectangles which may be cut from the cant based on the cant profile.

15. A method as in claim 12, wherein the cant is cut by a pair of rotary saws mounted on a common carriage.

* * * * *